Patented Oct. 27, 1953

2,657,227

UNITED STATES PATENT OFFICE 2,657,227

REMOVAL OF OXYGENATED ORGANIC COMPOUNDS FROM HYDROCARBONS

Raymond M. Burgison and Sylvan E. Forman, Baltimore, and Donald G. Zink, Linthicum, Md., assignors, by mesne assignments, to National Distillers Products Corporation, New York, N. Y., a corporation of Virginia No Drawing. Application October 18, 1947, Serial No. 780,750

7 Claims. (Cl. 260—450)

This invention relates to a method for the recovery of various oxygenated organic compounds from a mixture containing the same together with hydrocarbons.

It is known in the art to prepare hydrocarbons and olefins together with oxygenated organic compounds, such as acids, alcohols, aldehydes, esters and ketones by the reaction of carbon monoxide with hydrogen in the presence of any of a number of catalysts under various conditions of temperatures and pressures. Such a reaction may be effected, for example, in accordance with the method of Fischer and Tropsch by contacting a mixture of carbon monoxide and hydrogen with an iron-potash catalyst under a pressure of 100–150 atmospheres and at a temperature of 400–450° C. The product of the aforementioned Fischer and Tropsch method upon partial condensation separates into two layers, viz., an aqueous layer and an oil layer, both of which contain the aforementioned oxygenated organic compounds. The latter layer also contains hydrocarbons. Separation of the oil layer into its components by simple rectification is difficult, due to the wide variety of compounds contained therein, and it is therefore the primary object of this invention to provide a method for the concentration of oxygenated organic compounds contained in admixture with hydrocarbons, in order that such valuable oxygenated compounds may be readily and effectively utilized and separated from each other.

The aforementioned and other objects are accomplished in accordance with this invention by admixing the mixture of oxygenated compounds and hydrocarbons (oil layer) with methanol and water in proportions such that a hydrocarbon phase of reduced content of oxygenated organic compounds and a methanol phase containing the oxygenated organic compounds extracted from the mixture of oxygenated compounds and hydrocarbons are obtained.

The following examples illustrate in detail the practice of the method of this invention, and are to be not considered limitative thereof:

EXAMPLE I 10,000 ml. of a mixture of hydrocarbons and oxygenated compounds containing 7% alcohols (assumed average molecular weight of 100) by weight was intimately contacted with 10,000 ml. of 97% methanol (97% methanol and 3% water by volume). The system was two-phase, and after the mixture had been permitted to settle there remained 5,800 ml. of hydrocarbon phase containing 3.66% alcohols (assumed average molecular weight of 100), excluding the methanol contained therein. The methanol layer, amounting to 14,700 ml. was diluted with 700 ml. of water to yield 2,500 ml. of hydrocarbon layer containing 3.8% alcohols (assumed average molecular weight of 100), excluding methanol. The methanol layer, amounting to 12,600 ml. was thereafter diluted with 2,000 ml. of water to yield 1,500 ml. of hydrocarbon phase containing 12% of alcohols (assumed average molecular weight of 100), excluding methanol. The methanol layer, amounting to 12,700 ml., was then distilled in a precision column. The materials boiling at temperatures up to 70° C. contained methanol and some lower boiling oxygenated compounds. The materials boiling within the range of 70–80° C. amounted to about 2,000 ml. and had a sharp odor, indicating the presence therein of aldehydes. The residual oil in the still was 46.5% alcohols (assumed average molecular weight of 100 and amounting to 48% of the alcohols in the oil layer used as a starting material) and 33% acids (assumed average molecular weight of 100). This oil weighed 585 gms. and measured 655 ml.

EXAMPLE II

As Example I illustrates, the method of the present invention has an advantage in that it is effective in concentrating organic acids contained in admixture with hydrocarbons and other oxygenated compounds. However, since such acids distribute themselves to a certain extent when the resulting mixture is fractionated as in Example I, and since they can be recovered completely by a preliminary aqueous caustic wash of the hydrocarbon layer before treating it in accordance with this invention, it is preferred that a procedure involving such a preliminary caustic wash be followed. Thus, after subjecting a similar sample of a mixture of hydrocarbons and oxygnated compounds to such a preliminary caustic wash and a series of extractions similar to those of Example I, there was obtained a sample which was 52.7% alcohols, 5.5% esters, and 23.7% aldehydes and ketones (assumed molecular weight of the alcohols, esters, and aldehydes and ketones of 100). This sample was subjected to fractional distillation in a precision column, yielding the fractions indicated in the table which follows:

| Boiling range/mm. of mercury | Alcohols | | Aldhydes & Ketones | | Wt. percent of sample |
|---|---|---|---|---|---|
| | Carbons | Wt. percent of fraction | Carbons | Wt. percent of fraction | |
| 80–89/200 | | | $C_6$ | 26.5 | 1.9 |
| 89–94/200 | | | $C_6$ | 25.95 | 1.2 |
| 94–99/200 | | | $C_6, C_7$ | 31.2 | 3.0 |
| 99–102/200 | $C_5$ | 63.2 | $C_7$ | 23.3 | 5.4 |
| 102–105/200 | | | $C_7$ | 19.7 | 3.1 |
| 105–115/200 | | | $C_7$ | 19.7 | 3.8 |
| 115–120/200 | $C_6$ | 70.3 | $C_7, C_8$ | 11.25 | 8.1 |
| 120–125/200 | | | $C_7, C_8$ | 20.45 | 1.6 |
| 66–84/50 | | | $C_7, C_8$ | 44.5 | 1.3 |
| 84–91/50 | | | $C_8$ | 37.9 | 2.8 |
| 91–99/50 | $C_6, C_7$ | 41.6 | $C_8$ | 27.95 | 4.8 |
| 99–105/50 | $C_8$ | 68.3 | $C_8, C_9$ | 17.9 | 7.9 |
| 85–94/20 | $C_8, C_9$ | 43.7 | $C_9$ | 29.9 | 2.8 |
| 94–98/20 | $C_9$ | 59.1 | $C_9$ | 29.9 | 4.9 |
| 98–103/20 | $C_9$ | 74.7 | $C_9, C_{10}$ | 12.4 | 3.0 |
| 103–108/20 | $C_9, C_{10}$ | 58.8 | $C_{10}$ | 15.2 | 2.1 |
| 108–117/20 | $C_{10}$ | 71.4 | $C_{10}, C_{11}$ | 12.5 | 4.9 |
| 92–100/5.5 | $C_{10}, C_{11}$ | 55.3 | $C_{11}$ | 18.5 | 2.1 |
| 100–106/5.5 | $C_{11}$ | 58.3 | $C_{11}, C_{12}$ | 16.1 | 3.7 |
| 106–112/5.5 | $C_{11}$ | 58.5 | $C_{12}$ | 18.0 | 2.5 |
| Residue | $C_{15}$ | 29.5 | | | 18.1 |

From an inspection of the foregoing table, it is apparent that the practice of the method of this invention has resulted in a substantial concentration of the alcohols, aldehydes and ketones contained in the hydrocarbon layer treated. If desired, such alcohols, aldehydes and ketones may be recovered in a still purer condition in accordance with the procedures which are well understood in the art, e. g., further rectification of selected fractions. Moreover, the aldehydes and ketones may be precipitated from the methanol layer with sodium bisulfite solution. Such a method yields a filterable precipitate, whereas the original mixture of hydrocarbons and oxygenated compounds, frequently yields a gel when thus extracted. In addition, if desired, the distillate fractions may be reduced, thus converting the aldehydes and ketones into primary and secondary alcohols, which may be separated by further fractionation. Furthermore, the aldehydes in the mixture may be oxidized to acids and removed therefrom as has been previously described. Also, if desired, selected fractions may be reacted with phthalic anhydride to yield high-boiling esters (plasticizers) which may be recovered by distillation therefrom of the remainder of the reaction mixture. Other methods of utilizing the concentrated mixture of oxygenated compounds will suggest themselves to those skilled in the art.

Various modifications may be made in the specific procedures of the examples to result in a substantial concentration of the oxygenated organic compounds contained in admixture with hydrocarbons. Thus, the 5,800 ml. oil layer containing 3.66% alcohols (assumed average molecular weight of 100) obtained in Example I was further extracted with 10,000 ml. of 97% methanol to yield 3,600 ml. of oil containing 1.3% alcohols (assumed average molecular weight of 100), excluding methanol. The second methanol extract of 12,200 ml. thus obtained may be employed as the first extractant of a fresh or unextracted oil layer. Furthermore, the residual oil yielded by such a second extraction with methanol contains some methanol which may be recovered by extraction with water or by distillation. In addition, the 2,500 ml. oil layer containing 3.8% alcohols (assumed average molecular weight of 100) obtained in Example I may be extracted with 90% methanol (i. e., 90% methanol and 10% water by volume) to result in the extraction of more alcohols. Moreover, the 1,500 ml. oil layer containing 12% alcohols (assumed average molecular weight of 100), excluding methanol, obtained in Example I may also be further extracted with methanol to recover therefrom additional alcohols. Furthermore, although a solution containing 97% methanol and 3% water was employed as an extractant in the examples, there may be substituted therefor methanol which is completely anhydrous. In practicing such a procedure, completely anhydrous methanol and the mixture of oxygenated compounds and hydrocarbons may be admixed to form a true solution, which may then be admixed with water to form a two-phase system, viz., an oil layer of decreased content of oxygenated organic compounds and a methanol layer containing the oxygenated compounds which have been extracted from the oil layer. As a further alternative, the oxygenated organic compounds may be concentrated in accordance with the method of this invention simply by admixing the oxygenated compound-hydrocarbon mixture and aqueous methanol, e. g., 90% methanol.

In practicing the method of the present invention, it is preferred, however, that the oxygenated organic compounds be continuously extracted from the hydrocarbon layer by contacting it in the middle portion of a suitable vessel with a solution of 97% methanol and 3% water. Such contact may be effected by feeding the hydrocarbon layer to the extraction vessel below the point at which the aqueous methanol is fed and results in the production of a two-phase system as indicated above. Such a system may be conveniently separated into a hydrocarbon layer and a methanol layer, the former being withdrawn from the top, and the latter from the bottom, of the extraction vessel. From the former layer the methanol contained therein may be recovered for further use by extraction or by distillation, or the methanol-containing oil layer may be used as such as a fuel. After it has been separated, the methanol layer is preferably admixed with water in proportions such that the ratio of the total volume of methanol used to the total volume of water used (both as the "97% methanol" and as the further water added) is 70:30. The admixing of the methanol layer and the additional water again results in the production of an oil layer and a methanol layer. The oil layer may be returned to the contact vessel in order that additional amounts of oxygenated organic compounds may be recovered from such layer. The methanol layer, on the other hand, may be rectified to remove some hydrocarbons and methanol, leaving a two-phase residue in the distillation apparatus. Such residue consists of a water layer and an oil layer containing substantial quantities (of the order of 80%) of oxygenated organic compounds. Such compounds may be further concentrated by precision fractionation of the oil layer and/or processed in accordance with the methods hereinbefore indicated. The water layer may, if desired, be steamed in order to recover additional values therefrom.

The method of the present invention is subject to considerable variation with respect to the relative amounts of methanol used as an extractant of the oxygenated compound-hydrocarbon mixture. In general, in order that the method may result in a substantial recovery of the oxygenated organic compounds at least about 0.25 volume of methanol per volume of oil layer should be employed. It is preferred, however, that from about 0.5 to about 2.0 volumes of methanol per volume of oil layer be used. In addition, at least about 0.03 volumes of water per volume of methanol should be employed in effecting the separation of the mixture into the oil layer and the methanol layer. Thus, the relative amounts of the water and methanol utilized may be varied widely, but for economical operation more than about 0.50 volumes of water per volume of methanol should not be employed. In this connection, it has generally been found that the preferred volume ratio of water to methanol should be within the range of from about 0.03 to about 0.30. In conducting the processes of the examples, temperatures of about room temperature were used. Here, again, the method of the present invention is susceptible of considerable variation, so that the method may be conducted at temperatures below about 0° C. and above about 70° C. In general, however, temperatures within the range of from about 15° C. to about 40° C. will be found to be the most desirable.

As the examples illustrate, the method of the present invention is advantageous in that when it is practiced it results in a good recovery in a concentrated form of the oxygenated organic compounds contained in a mixture together with hydrocarbons. Such mixtures, in addition to being prepared by the process previously outlined, may be prepared, for example, by contacting a mixture of carbon monoxide and hydrogen with a cobalt thoria catalyst at 355–390° F. at substantially atmospheric pressure followed by partial condensation of the products of the reaction; by the reaction of methane and oxygen in an open-type generator at 2500° F. and 250 lbs. per sq. in. to form a gaseous mixture which is then scrubbed with water, contacted with a fluidized bed of powdered iron catalyst at 650° F. and 245 lbs. per sq. in., followed by a partial condensation of the reaction products; etc. The method is of the greatest utility in extracting and concentrating the alcohols, aldehydes, and ketones, but it also results in the concentration of the acids and esters, although to a somewhat lesser extent.

We claim:

1. The process of separating oxygenated organic compounds, such as, acids, alcohols, aldehydes, ketones, and esters, having an average molecular weight of at least 100, from the oil phase separated from the catalytic reaction product of carbon monoxide and hydrogen, said process comprising the steps of mixing methanol and water with said oil phase, the proportion of methanol used being within the range of ¼ volume to 2 volumes of methanol per volume of the oil phase and the proportion of water used being within the range of 0.03 to 0.1 volume of water per volume of water plus methanol, separating the resulting mixture to form a second oil phase and a methanol phase, the latter containing an increased proportion of the oxygenated organic compounds, admixing additional water with the separated methanol phase and thereby separating said methanol phase into a further oil phase and a second methanol phase, the latter containing a further increased proportion of the oxygenated organic compounds, the ratio of total methanol to total water added being not less than 70:30.

2. The process of claim 1 in which the ratio of methanol to water initially added to the oil phase is about 97:3, and the amount of water added to the first methanol phase is such as to bring the ratio of methanol to water therein to about 90:10.

3. The process of separating oxygenated organic compounds, such as, acids, alcohols, aldehydes, ketones, and esters, having an average molecular weight of at least 100, from the oil phase separated from the catalytic reaction product of carbon monoxide and hydrogen, said process comprising the steps of mixing methanol and water with said oil phase, the proportion of methanol used being within the range of ¼ volume to 2 volumes of methanol per volume of the oil phase and the proportion of water used being within the range of 0.03 to 0.1 volume of water per volume of water plus methanol, separating the resulting mixture to form a second oil phase and a methanol phase, the latter containing an increased proportion of the oxygenated organic compounds, admixing additional water with the separated methanol phase and thereby separating said methanol phase into a further oil phase and a second methanol phase, the latter containing a further increased proportion of the oxygenated organic compounds, admixing additional water with said second methanol phase and thereby separating said second methanol phase into a third oil phase and a still further methanol phase, the latter containing a further increased proportion of the oxygenated organic compounds, the ratio of total methanol to total water added being not less than 70:30.

4. The process of claim 3 in which the ratio of methanol to water initially added to the oil phase is about 90:3, the amount of water added to the first methanol phase is such as to bring the ratio of methanol to water therein to about 90:10, and the amount of water added to the second methanol phase is such as to bring the ratio of methanol to water in it to about 70:30.

5. The process of separating oxygenated organic compounds, such as, acids, alcohols, aldehydes, ketones, and esters, having an average molecular weight of at least 100, from the oil phase separated from the catalytic reaction product of carbon monoxide and hydrogen, said process comprising the steps of mixing methanol and water with said oil phase, the proportion of methanol used being within the range of ¼ volume to 2 volumes of methanol per volume of the oil phase and the proportion of water used being within the range of 0.03 to 0.1 volume of water per volume of water plus methanol, separating the resulting mixture to form a second oil phase and a methanol phase, the latter containing an increased proportion of the oxygenated organic compounds, admixing additional water with the separated methanol phase and thereby separating said methanol phase into a further oil phase and a second methanol phase, the latter containing a further increased proportion of the oxygenated organic compounds, admixing additional water with said second methanol phase and thereby separating the last said second methanol phase into a still further oil phase and a third methanol phase, the latter containing a further increased proportion of the oxygenated organic compounds, and repeating the adding of additional water to the last separated methanol phase and the forming of further oil phases and further methanol phases of progressively increasing proportions of oxygenated organic compounds until the ratio of total methanol used to total water used is about 70:30.

6. The process of claim 5 in which the ratio of methanol to water initially added to the oil phase is 97:3.

7. The process of claim 6 in which the volume of methanol and water initially added to the oil phase is substantially equal to the volume of the oil phase.

RAYMOND M. BURGISON.
SYLVAN E. FORMAN.
DONALD G. ZINK.

References Cited in the file of this patent

UNITED STATES PATENTS

| Number | Name | Date |
| --- | --- | --- |
| 1,870,816 | Lewis | Aug. 9, 1932 |
| 2,115,553 | Giesen et al. | Apr. 26, 1938 |
| 2,470,782 | McGrath et al. | May 24, 1949 |
| 2,516,940 | Arnold et al. | Aug. 1, 1950 |
| 2,552,564 | King et al. | May 15, 1951 |

OTHER REFERENCES

U. S. Technical Mission in Europe, pages 84, 85, and 90, "The Synthesis of Hydrocarbons and Chemicals from CO and $H_2$." Technical Report No. 248-45. September 1945. Published as PB-22841 (abstract). Listed in Bibliography of Scientific and Industrial Reports, Dep't of Commerce, OTS. Vol. 2, No. 5, page 321, August 2, 1946.